(12) United States Patent
Nichol et al.

(10) Patent No.: US 10,081,553 B2
(45) Date of Patent: Sep. 25, 2018

(54) PROCESS FOR MAKING HIGH-PURITY ALUMINUM OXIDE

(71) Applicant: Polar Sapphire Ltd., Toronto (CA)

(72) Inventors: Scott Nichol, Toronto (CA); Daniel Smith, Brampton (CA)

(73) Assignee: POLAR SAPPHIRE, LTD., Toronto Ontario (CA)

( * ) Notice: Subject to any disclaimer, the term of this patent is extended or adjusted under 35 U.S.C. 154(b) by 0 days.

(21) Appl. No.: 15/552,946

(22) PCT Filed: Feb. 12, 2016

(86) PCT No.: PCT/CA2016/050131
§ 371 (c)(1),
(2) Date: Aug. 23, 2017

(87) PCT Pub. No.: WO2016/134455
PCT Pub. Date: Sep. 1, 2016

(65) Prior Publication Data
US 2018/0044196 A1    Feb. 15, 2018

Related U.S. Application Data

(60) Provisional application No. 62/119,402, filed on Feb. 23, 2015.

(51) Int. Cl.
*C01F 7/00* (2006.01)
*C01F 7/44* (2006.01)
(Continued)

(52) U.S. Cl.
CPC .............. *C01F 7/441* (2013.01); *C01F 7/023* (2013.01); *C01F 7/20* (2013.01); *C01F 7/30* (2013.01);
(Continued)

(58) Field of Classification Search
CPC .... C01F 7/42; C01F 7/30; C01F 7/441; C01F 7/56; C01F 7/428; C01F 7/306; C01F 7/308; C01F 7/32
(Continued)

(56) References Cited

U.S. PATENT DOCUMENTS 3,852,430 A * 12/1974 Lienau .................... C01B 7/03
                                                                  423/481
4,107,281 A *  8/1978 Reh ........................ C01F 7/306
                                                                  423/625
(Continued)

FOREIGN PATENT DOCUMENTS

DE        2525929        *  1/1976
JP        10-338520      * 12/1998
WO   WO-2014094155 A1      6/2014

OTHER PUBLICATIONS

"International Application Serial No. PCT/CA2016/050131, International Search Report dated Apr. 28, 2016", 3 pgs.
(Continued)

*Primary Examiner* — Steven J Bos
(74) *Attorney, Agent, or Firm* — Schwegman Lundberg & Woessner, P.A.

(57) ABSTRACT

A method comprising (a) reacting aluminum metal with an acid in the presence of water to provide a first aluminum salt solution comprising an aluminum salt in water, wherein the aluminum salt comprises a reaction product of the acid and the aluminum metal, (b) heating the first aluminum salt solution to provide a mother liquor and solid aluminum salt, (c) optionally, separating the solid aluminum salt from the mother liquor, (d) optionally, dissolving at least a portion of the separated solid aluminum salt with water to provide a second aluminum salt solution, (e) spray roasting the first, or second (if produced), aluminum salt solution to provide an aluminum oxide powder, and (f) washing the aluminum
(Continued)

oxide powder, wherein the washed aluminum oxide powder comprises less than about 30 ppmw total metallic and alkyl impurities.

20 Claims, 2 Drawing Sheets

(51) Int. Cl.
| | |
|---|---|
| *C01F 7/30* | (2006.01) |
| *C01F 7/20* | (2006.01) |
| *C01F 7/02* | (2006.01) |
| *C04B 35/043* | (2006.01) |

(52) U.S. Cl.
CPC ........ *C04B 35/043* (2013.01); *C01P 2004/60* (2013.01); *C01P 2006/80* (2013.01); *C04B 2235/322* (2013.01); *C04B 2235/604* (2013.01); *C04B 2235/725* (2013.01)

(58) Field of Classification Search
USPC .................................. 423/126, 132, 625, 627
See application file for complete search history.

(56) References Cited

U.S. PATENT DOCUMENTS

| | | | | |
|---|---|---|---|---|
| 4,634,581 | A * | 1/1987 | Cambridge | C01F 7/306 423/126 |
| 5,980,850 | A * | 11/1999 | Lebl | C23G 1/36 423/394.2 |
| 6,214,310 | B1 * | 4/2001 | Lebl | B01J 8/003 423/488 |
| 9,751,775 | B2 * | 9/2017 | Nichol | C01F 7/42 |
| 2015/0368117 | A1 * | 12/2015 | Nichol | C01F 7/42 423/626 |
| 2017/0073244 | A1 * | 3/2017 | Gabl | B09B 3/0083 |
| 2017/0183790 | A1 * | 6/2017 | Fournier | C25C 1/02 |

OTHER PUBLICATIONS

"International Application Serial No. PCT/CA2016/050131, Written Opinion dated Apr. 28, 2016", 6 pgs.

* cited by examiner

PROCESS FOR MAKING HIGH-PURITY ALUMINUM OXIDE

CROSS-REFERENCE TO RELATED APPLICATION

This application is a U.S. National Stage Filing under 35 U.S.C § 371 from International Application No. PCT/CA2016/050131 filed Feb. 12, 2016, and published as WO 2016/134455 on Sep. 1, 2016, which application claims priority to and the benefit of U.S. Provisional Patent Application No. 62/119,402, filed on Feb. 23, 2015, which applications and publications are incorporated herein by reference in their entirety.

BACKGROUND

High-purity aluminum oxide or alumina powder can be used to make translucent tubes for high-pressure sodium lamps, sapphires for watch covers, high-strength ceramic tools, abrasives for magnetic tape, light emitting diodes as a substrate for GaN, silicon microchip wafers for optic-electronics, windows and cowls for aircrafts, protective windows for car headlamps, cell phones and other electronic devices, stop signals, surgery scalpels, micro-optical elements of medical fiber-optic probes, optical scanners for bar codes, ultraviolet CD and DVD optical systems, prisms, lenses, optical plates, optical systems of visual and IR diapasons, cell phone, mobile devices and fiber-optic system display windows, equipment for chemical manufacturing in aggressive and high-temperature environments: tubes, crucibles, funnels, chemical glassware, abrasives, battery components, bearings and jewelry stones.

Currently the most common methods of making high-purity alumina for manufacturing Sapphire for LED substrates are aluminum-ammonium-sulfate thermal decomposition, aluminum-ammonium-carbonate thermal decomposition and aluminum-isopropoxide hydrolyzation. The high-purity alumina is then used in the Verneuil process to make crackle or compressed into densified pucks, granules or beads for melting in a sapphire ingot furnace.

Previous work in the field of alumina purification used aluminum trihydrate, bauxite, gibbsite, aluminum oxides, or ores containing aluminum oxide as the starting raw material for the process.

SUMMARY

The present disclosure describes a method of making a high-purity aluminum oxide (also referred to herein as "alumina") that can require less energy than conventional processes. The methods described herein use aluminum metal and an acid, such as hydrochloric acid (HCl), as the feedstock materials to provide an aluminum salt solution that is spray roasted to provide a high-purity alumina powder.

In an example, the present disclosure describes a method comprising reacting aluminum metal with an acid in the presence of water to provide a first aluminum salt solution comprising an aluminum salt in water, wherein the aluminum salt comprises a reaction product of the acid and the aluminum metal, heating the first aluminum salt solution to provide a mother liquor and solid aluminum salt, separating the solid aluminum salt from the mother liquor, dissolving at least a portion of the separated solid aluminum salt with water to provide a second aluminum salt solution, spray roasting the second aluminum salt solution to provide an aluminum oxide powder, and washing the aluminum oxide powder, wherein the washed aluminum oxide powder comprises less than about 30 ppmw total metallic and alkyl impurities.

The present disclosure also describes a method comprising reacting aluminum metal with an acid in the presence of water to provide an aluminum salt solution comprising an aluminum salt in water, wherein the aluminum salt comprises a reaction product of the acid and the aluminum metal, spray roasting the aluminum salt solution to provide an aluminum oxide powder, and washing the aluminum oxide powder, wherein the washed aluminum oxide powder comprises less than about 30 ppmw total metallic and alkyl impurities.

In accordance with one aspect of the present disclosure, there is provided a method comprising:
(a) reacting aluminum metal with an acid in the presence of water to provide an aluminum salt solution comprising an aluminum salt in water, wherein the aluminum salt comprises a reaction product of the acid and the aluminum metal; and
(b) spray roasting the aluminum salt solution to provide an aluminum oxide powder; and
(c) washing the aluminum oxide powder;
wherein the washed aluminum oxide powder comprises less than about 30 ppmw total metallic and alkyl impurities.

In accordance with one embodiment of this method, prior to step (b), the aluminum salt solution produced from step (a) is heated to produce aluminum salt crystals that are then dissolved in water to produce a second aluminum salt solution for spray roasting in step (b).

In accordance with another aspect of the present disclosure, there is provided a method comprising:
(a) reacting aluminum metal with an acid in the presence of water to provide a first aluminum salt solution comprising an aluminum salt in water, wherein the aluminum salt comprises a reaction product of the acid and the aluminum metal;
(b) heating the first aluminum salt solution to provide a mother liquor and solid aluminum salt;
(c) separating the solid aluminum salt from the mother liquor;
(d) dissolving at least a portion of the separated solid aluminum salt with water to provide a second aluminum salt solution;
(e) spray roasting the second aluminum salt solution to provide an aluminum oxide powder; and
(f) washing the aluminum oxide powder;
wherein the washed aluminum oxide powder comprises less than about 30 ppmw total metallic and alkyl impurities.

In accordance with another aspect of the present disclosure, there is provided high-purity aluminum oxide produced by the methods described herein. The high-purity aluminum oxide can have a purity of 4N or greater, for example it can have a purity of from about 4N to about 6N.

BRIEF DESCRIPTION OF THE DRAWING

In the drawings, like numerals can be used to describe similar elements throughout the several views. Like numerals having different letter suffixes can be used to represent different views of similar elements. The drawings illustrate generally, by way of example, but not by way of limitation, various examples discussed in the present document.

DETAILED DESCRIPTION

In the following Detailed Description, reference is made to the accompanying drawings which form a part hereof. The drawings show, by way of illustration, specific examples in which a process of producing a high-purity aluminum oxide can be practiced. The examples are described in sufficient detail to enable those skilled in the art to practice, and it is to be understood that other embodiments can be utilized and that changes can be made without departing from the scope of the present disclosure. Therefore, the following Detailed Description is not to be taken in a limiting sense, and the scope of the present disclosure is defined by the appended claims and their equivalents.

Figure 1:
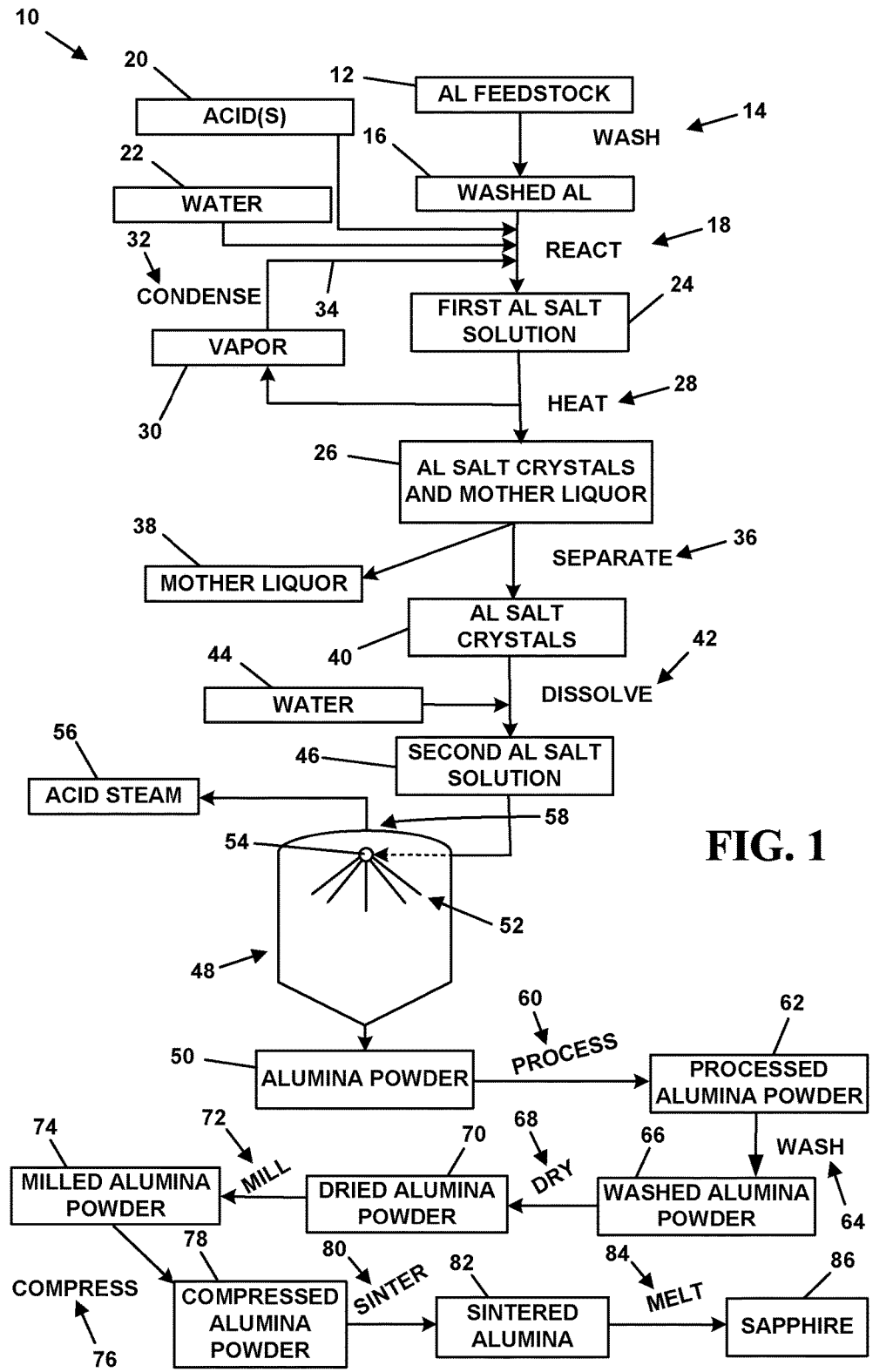
FIG. 1 is a flow diagram of an example method of producing high-purity aluminum oxide.

FIG. 1 shows a flow diagram of an example process 10 for producing high-purity aluminum oxide, for example to be used in the production of synthetic sapphire. As used herein, the term "high-purity aluminum oxide" refers to aluminum oxide having a purity of about 4N (99.99% pure, with an impurity level of only 0.01%, or 100 ppm) or greater. In some examples, the term "high-purity aluminum oxide" refers to aluminum oxide having a purity in the range of from about 4N to about 6N (99.9999% pure with an impurity level of only 0.0001%, or 1 ppm).

In process 10, an aluminum metal feedstock 12 can be provided. In an example, the aluminum feedstock 12 can comprise high-purity aluminum from the three-layer electrolytic process, also known as the Hoope process. The aluminum feedstock can have a purity of at least 99.9 at. % aluminum (e.g., 3N aluminum) or greater, such as 99.98 at. % aluminum or greater, for example 99.99 at. % aluminum (e.g., 4N aluminum) or greater, such as 99.995 at. % aluminum or greater, for example 99.998 at. % (e.g., 4.8N aluminum), such as 99.999 at. % (e.g., 5N aluminum) or greater. In an example, less than 0.02 wt. % of the total impurities are metallic impurities. In an example, each metallic element impurity is less than 0.01 wt. %. High-purity scrap aluminum can also be used as the aluminum feedstock 12, such as electrical conducting wire, lithographic foil, or electrolytic capacitor aluminum foils. In an example, the aluminum feedstock 12 can have less than 20 ppmw metal and alkali impurities. In an example, the aluminum feedstock 12 can have less than about 30 ppmw total impurities. Forms of the aluminum feedstock 12 include, but are not limited to, ingots, sows, chunks, foil, wire, pyramids, powder, or other commercially available forms of aluminum metal or aluminum containing ore.

Wash (14)

The surfaces of the aluminum feedstock 12 can optionally be washed 14 to provide a washed aluminum 16. The surfaces of the aluminum feedstock 12 can be washed 14 by treating the surfaces with one or more of an acid, base, soap, solvent, or alcohol. In an example, the aluminum feedstock 12 is washed 14 with hydrochloric acid (HCl) by contacting the aluminum feedstock 12 with the HCl for a time that is sufficient to clean the surfaces of the aluminum feedstock 12 to remove a specified portion of surface impurities. In an example, the aluminum feedstock 12 is contacted with a 5-20 wt. % HCl solution for from about 4 hours to about 24 hours, such as by placing the aluminum feedstock 12 in a washing vessel with the HCl solution for the specified period of time.

The treated surfaces of the aluminum feedstock 12 can then be rinsed with water to provide the washed aluminum 16. In an example, the water used to rinse the aluminum feedstock 12 after washing 14 is high-purity water.

Reaction with Acid (18)

The aluminum feedstock 12 or the washed aluminum 16 can be reacted 18 with one or more acids 20. Using aluminum as a starting raw material for manufacturing aluminum oxide can be difficult due to difficulties in controlling the reaction rate of the acid with the aluminum. High-purity aluminum reacts very slowly with acid, but the reaction can very quickly accelerate into a fast, exothermic reaction. Moreover, at each step of the process the feedstock can be contaminated by the reaction vessel, furnace or holding container. It can be important to control the reaction and temperature at each step to prevent contamination in the process in order to reach a high purity with a low cost. In the past it has been difficult to react high-purity aluminum economically in acid due to the fact that as the purity of the aluminum increases, the reaction of the aluminum with acid tends to slow down. Use of aluminum with very high surface area can also increase costs and potentially cause a runaway reaction due to the exothermic reaction.

Previous research on using acids to process ores high in aluminum content into aluminum oxide was primarily for the production of alumina for use in manufacturing primary aluminum. These processes are concerned with reaching the purity limits for the Hall-Heroult process, and do not purport to provide for the typical 4-6N purity requirements for producing a sapphire grade sufficient for LED substrates or other high-purity alumina applications. Conventionally-produced alumina powder for sapphire feedstock applications typically have at least the following impurity levels: Na<10 ppmw; Fe<5 ppmw; Si<10 ppmw; Ti<3 ppmw; Mg<2 ppm2; Ca<2 ppmw, and aluminum oxide purity of only about 99.99% (or 4N) purity. Higher alumina purities, such as 5N or greater, as feedstock for sapphire ingots can increase the yield and throughput for sapphire production processes.

The one or more acids 20 can include, but are not limited to, one or any combination of sulfuric acid ($H_2SO_4$), nitric acid ($HNO_3$), phosphoric acid ($H_3PO_4$), hydrochloric acid (HCl), and hydrofluoric acid (HF). The acid can have a high purity, such as an acid having less than 1 ppmw impurities for all elements. In an example, the acid can comprise less than about 1 ppmw of Na, Ca, Li, Fe, Zn, Cu, Ti, Cr, K, and Mg. In an example, the acid can comprise less than about 0.2 ppmw of metallic impurities. The one or more acids 20 can also be industrial-grade acids, such as industrial grade HCl, which has been purified via one or more of filtration, an ion-exchange process, distillation, and a diffusion dialysis process.

Water 22 can be used to dilute the acid to a desired concentration before or during the reaction 18. The one or more acids 20 and the water 22 can be added to the reaction 18 as the aluminum 16 is being leached. The water can have a high purity, such water that has been purified by one or any combination of deionization, filtration, reverse osmosis, or distillation. As used herein, the term "high-purity water" can refer to water that has been purified by one or any combination of deionization, filtration, reverse osmosis, and distillation. In an example, "high-purity water" can be at least about 99.999 wt. % pure water. In some examples, "high-purity water" can have less than about 0.5 ppmw total impurities, such as less than about 0.2 ppmw total impurities. In an example, "high-purity water" can refer to water having a resistivity of 18 mega ohms×centimeter at 25° C. (MΩ·cm @ 25° C.) or greater.

The reaction 18 of the one or more acids 20 and the aluminum 16 in the water 22 results in the formation of a first hydrated aluminum salt solution 24 comprising hydrated aluminum salt in water. The reaction 18 of the one or more acids 20 and the aluminum 16 can be referred to as leaching the aluminum 16. The aluminum 16 can be dissolved in the acid 20 to form the hydrated aluminum salt solution 24. The one or more acids 20 and the water 22 can be added in a sufficient amount so that substantially all the hydrated aluminum salt 24 can be dissolved in the liquid. Additional water having a high purity can be added in the form of a diluted high-purity acid or straight high-purity water. In examples where the acid 20 comprises HCl, the hydrated aluminum salt of the first hydrated aluminum salt solution 24 comprises hydrated aluminum chloro hydrate, also referred to as poly aluminum chloride (PAC), which is a group of aluminum salts having the general formula $Al_nCl_{(3n-m)}(OH)_m$.

The reaction can be run until all or substantially all of the available hydrogen from the acid 20 is released as hydrogen gas ($H_2$). The hydrated aluminum salt solution 24, such as poly aluminum chloride, that is formed by the reaction 18 can have a density of from about 1.25 grams/cm$^3$ ("g/cc") to about 1.37 g/cc once all the acid 20 has been reacted. The reaction 18 can take from about 6 hours to about 72 hours for all the acid 20 to be reacted to form the hydrated aluminum salt solution 24.

The reaction 18 can be performed in high-temperature stable and acid resistant reaction vessel, such as a tank, with ventilation for $H_2$ gas formed during the reaction (not shown). In an example, the reaction vessel can comprise a high-temperature resistant plastic that will be thermally stable at temperatures of at least 25° C. to about 120° C. An interior of the reaction vessel can comprise a non-contaminating material that can resist the chemical conditions of the reaction 18 without contaminating the process with additional impurities, also referred to herein as a "non-contaminating material," a "non-contaminating tank" or a "non-contaminating vessel." In an example, the reaction vessel can hold from about 400 L to about 4000 L. Examples of potential reaction vessel materials include, but are not limited to, are polyvinylidene difluoride (PVDF), such as PVDF sold under the trade name KYNAR; polytetrafluoroethylene (PTFE), such as PTFE sold under the trade name TEFLON; fluorinated ethylene propylene (FEP), such as FEP sold under the trade name TEFLON FEP; perfluoroalkoxy (PFA), such as PFA sold under the trade name TEFLON PFA; polypropolyene (PP); or other high temperature plastics that can resist the temperature and chemical attack. The reaction vessel can also comprise a non-chemical resistant base material having a fluorinated coatings, such as a PTFE coating or a PFA coating, or both, an acid-resistant epoxy coating, or a high-temperature plastic coating, such as one of the materials described above.

The reaction vessel can be insulated on some or all sides, including a top and a bottom. The reaction vessel can include a lid that vents to a scrubber or an exhaust. Exhaust fumes from the reaction 18 can go to one or any combination of a scrubber, a condenser, or other device for recycling of the water and acid. The exhaust fumes can be refluxed and condensed acid can be flowed back into the reaction vessel. The reaction vessel can be vented with air to dilute hydrogen level below a lower explosion limit. The vented air can be filtered to remove dust.

The reaction 18 can be limited by the amount of the one or more acids 20 added to the reaction vessel. The one or more acids 20 can be added all at once, metered into the reaction vessel over time, or added at the beginning of the reaction 18 and then further metered in over time. In an example, the aluminum feedstock 12 or the washed aluminum 16 and the water 22 can be added to the reaction vessel, and the one or more acids 20 are metered into the reaction vessel over time at a controlled rate. Additional water 22 can also be metered into the reaction vessel as the one or more acids 20 are metered into the reaction vessel.

At least a stoichiometric amount of the aluminum 12, 16 can be added to the reaction vessel for the reaction 18, but excess aluminum 12, 16 can also be added to the reaction vessel. Excess, un reacted aluminum 12, 16 can be left in the reaction vessel for a subsequent next batch, or the excess, un reacted aluminum 12, 16 can be separated from the hydrated aluminum salt solution 24. In an example, a constant or substantially constant surface area of the aluminum 12, 16 can be used in the reaction vessel from batch to batch, so that aluminum can be added after each batch to replace the aluminum that was reacted in a previous batch. The water 22 and the aluminum 12, 16 can be added to the reaction vessel first followed by metering the one or more acids 20 into the reaction vessel.

The liquid in the reaction vessel can be heated to a temperature of from about 25° C. to about 130° C., such as from about 65° C. to about 110° C. The vessel can be heated using external heat and/or the heat from the exothermic reaction in the vessel. Depending on the composition of the one or more acids 20, e.g., the concentration of the acid in the reactant solution, which can be dictated by the rate of addition of the one or more acids 20 to the reaction vessel, the amount of water 22 in the reaction vessel, and the surface area of the aluminum 12 or 16, the exothermic nature of the reaction between the aluminum 12 or 16 and the acid 20 can provide some or all of the heat necessary for the reaction 18. In some examples, an additional heat source can be used. The vessel can be heated using a heat exchanger in the tank, coated heating elements, or hot fluid pumped through coils or a heat exchanger resistant to the temperature at which the reaction 18 is run and the chemicals present in the reaction vessel.

The liquid in the reaction vessel can be mixed during the reaction 18, for example by rotary stirring of the contents of the reaction vessel, pumping the liquid around the reaction vessel, or another method.

When the reaction 18 occurs with some grades of aluminum, small particles can be seen in the liquid that includes the hydrated aluminum salt solution 24. These small particles can typically be impurities that have not dissolved in the acid mixture. For example, if iron impurities are present in the aluminum feedstock 12 and HCl is used as the acid 20, small black particles can form in the reaction liquid. The lower the purity of aluminum feedstock 12, the more likely that these small particles will be seen in the reaction vessel. Some of the particles will dissolve over time, reducing the purity of the hydrated aluminum salt solution 24, and thus reducing the final purity of the aluminum oxide. Therefore, the hydrated aluminum salt solution 24 can optionally be filtered to remove the impurity particles from the liquid to form a filtered hydrated aluminum salt solution. The filtration can take place in conjunction with the reaction 18 or downstream of the reaction 18. In an example, the liquid can be continuously filtered while the reaction 18 is progressing to remove the impurity particles. In an example, at least one of magnetic separation, acid resistant filters, an ion-exchange resin, one or more centrifuges, one or more filter bags, one or more filter cartridges, and settling can be used to accomplish filtration of the first hydrated aluminum salt solution 24. Alternative to filtering, or in addition to filtering, the impurity particles can be removed with one or more solvents that can dissolve the particles, but that are not miscible in water so that the solvent with dissolved impurity can be easily removed from the reaction liquid, which is water-based. In examples where the feedstock aluminum 12, 16 has sufficiently high purity, these small particles do not appear and thus, in some examples, filtering is not necessary.

In some examples, the aluminum feedstock 12 can be of sufficiently high purity such that filtering or removal of impurity particles the hydrated aluminum salt solution 24 is not necessary to achieve acceptable final purity of the aluminum oxide.

Heating (28)

The first hydrated aluminum salt solution 24 formed in the reaction 18 can be precipitated from the solution 24 to provide a mixture 26 of solid hydrated aluminum salt crystals and a mother liquor. In an example, precipitation to solid hydrated aluminum salt crystals can be accomplished by heating 28 the solution 24 in order to evaporate water and other liquids. By removing water, gases, and other liquids from the first hydrated aluminum salt solution 24, the concentration of the hydrated aluminum salt in the solution 24 can increase and can eventually become saturated so that solid hydrated aluminum salt crystals precipitate out of the solution 24. In an example, the first hydrated aluminum salt solution 24 can be heated at a temperature of from about 100° C. to about 140° C. Some acids 20 can require a higher temperature during heating 28 in order to evaporate a sufficient amount of water from the solution 24. In an example, the first hydrated aluminum salt solution 24 can be heated from about 8 hours to about 72 hours. The first hydrated aluminum salt solution 24 can be heated until from about 70% to about 99.9% of the liquid has been evaporated, such as when about 0% to about 20% of the liquid remains. Alternatively the majority of the liquid can be evaporated and then a small percentage of water, such as high-purity water, can be added back into the salt to create some mother liquor. The aluminum salt solution 24 can be heated 28 in the same vessel in which the aluminum 12, 16 was reacted with the one or more acids 20 if the remaining aluminum is removed, or the heating 28 can be performed in a separate vessel.

In an example, the heating 28 to precipitate out the aluminum salt crystals into the mixture 26 of aluminum salt crystals and mother liquor can be performed in a heating vessel comprising materials that will not add contamination to the process, also referred to as a non-contaminating heating vessel or as non-contaminating material. In an example, the heating vessel can comprise at least one of a high-temperature plastic such as PTFE, FEP, PFA, PVDF, alumina; or other high temperature plastics or ceramics that can withstand the temperature of the heating step 28 and chemical attack by the salts, liquid, and vapor present in the heating vessel. The heating vessel can also be made of another material that is coated with PTFE, FEP, PFA, PVDF, alumina, or another high-temperature plastic or ceramic that can withstand the temperature and chemicals of the heating vessel.

Examples of methods to heat the solution 24 in the heating vessel can include, but are not limited to, at least one of: heating in a furnace, heating with a heat exchanger coil, heating with an immersion heater, heating with a hot oil heater, heating with steam, heating with a PTFE or graphite heat exchanger in the solution 24, heating by injecting high-purity steam with a boiler, or heating with external heat.

The vessel can have a filter air inlet and a vent for the acidic steam. The heating vessel can comprise a draft so that the aluminum salt crystals and mother liquor mixture 26 can be easily removed from the heating vessel. Evaporated vapor 30 that results from the heating 28 can be condensed 32 and recycled to recover water and acid. A blower can be used to force air through the reaction vessel and to withdraw the water and acid vapor 30 can be condensed 32 in a heat exchanger to provide a condensed liquid 34. Any uncondensed vapor can be processed by a scrubber, neutralized, and then vented to the atmosphere. The condensed liquid 34 can be recycled and reused in the process, for example by recycling the condensed liquid 34 back to the reaction 18 between the aluminum 12, 16 and the acid 20. The condensed liquid 34 can be purified before recycling. In an example, the condensed liquid 34 can be used to make lower quality alumina.

In an example, the heating 28 to provide the aluminum salt crystals and the mother liquor mixture 26 can be performed in a container or vessel under vacuum, e.g., with the pressure within the heating vessel being less than atmospheric pressure. The application of a vacuum to the heating vessel can increase the rate at which steam and acid vapor 30 are removed from the vessel, which, in turn, can increase the rate and extent of precipitation of aluminum salt crystals into the mixture of the aluminum salt crystals and mother liquor mixture 26. The application of the vacuum to the heating vessel has been found to speed up the rate of evaporation and lower the required reaction temperature.

In an example, the vacuum can be provided with a blower capable of applying a vacuum pressure to the vessel. In an example, a blower rated for at least about 5 inches of water (about 0.012 bar) can be used to provide the vacuum pressure. In an example, the vacuum pressure within the vessel (e.g., the pressure below atmospheric pressure) can be at least 0.005 bar vacuum, such as at least about 0.01 bar vacuum, for example at least about 0.015 bar vacuum, such as at least about 0.02 bar vacuum, at least about 0.03 bar vacuum, at least about 0.04 bar vacuum, at least about 0.05 bar vacuum, at least about 0.1 bar vacuum, at least about 0.15 bar vacuum, at least about 0.2 bar vacuum, or at least about 0.25 bar vacuum.

Alternative to, or in conjunction with, the heating 28, HCl gas, high-purity HCl acid solution, or another acid solution, such as $H_2SO_4$, can be injected into the first hydrated aluminum salt solution 24 in order to lower the solubility of the hydrated aluminum salts in the first hydrated aluminum salt solution 24 in order to cause the salts to precipitate. In an example, a 38% HCl solution having a high purity can be added to the first hydrated aluminum salt solution 24 in order to precipitate out aluminum salt crystals to provide the solid hydrated aluminum salt crystals and the mother liquor mixture 26.

Separation (36)

The hydrated aluminum salt crystals and mother liquor mixture 26 can be separated 36 to provide separated mother liquor 38 and hydrated aluminum salt crystals 40. The separation 36 process can include, but is not limited to, settling, filtering, or centrifuging the hydrated aluminum salt crystals and mother liquor mixture 26. The separation 36 can be performed in one or more non-contaminating separation vessels, which can comprise one of the non-contaminating materials described above with respect to the reaction vessel and the heating vessel. The separation 36 can be done at room temperature or at any temperature up to the evaporation temperature of the process. The hydrated aluminum salt crystals and mother liquor mixture 26 can be allowed to cool to room temperature before separation 36. The hydrated aluminum salt crystals and mother liquor mixture 26 also can be slowly cooled to room temperature before separation 36. In an example, the mother liquor 38 can be separated 36 by draining the mother liquor 38 from the vessel in which it was created by opening a filtered valve, such as a valve with a plastic filter cloth or perforated plastic drain, and removing the mother liquor 38 by gravity drainage from the vessel.

In an example, the separation vessel can comprise a container, such as a high-temperature, acid-resistant plastic container, comprising an acid-resistant filter, such as a filter cloth, a plastic filter, a filter bag, or a plurality of holes in the container, such as in the bottom and sides of the container, that can allow the mother liquor 38 to drain out of the container and away from the hydrated aluminum salt crystals 40. Alternatively, the mother liquor 38 and the hydrated aluminum salt crystals 40 can be separated using centrifugation, a filter press, vacuum assisted drainage, or other mechanical separation methods. The separated mother liquor 38 can be used to make a lower purity alumina, as is known in the art.

The separated hydrated aluminum salt crystals 40 can optionally be washed with a washing liquid. In an example, the washing liquid can comprise at least one of a high-purity acid, such as HCl, high-purity acetone or another solvent, a high-purity solution of the hydrated aluminum salt (e.g., if the crystals 40 are polyaluminum chloride crystals, then a polyaluminum chloride solution can be used as the washing liquid), and high-purity water. In an example, an acid washing liquid (e.g., high-purity HCl) is used with a concentration that is sufficiently high so that a substantial portion of the hydrated aluminum salt crystals 40 do not dissolve back into solution. The washing of the hydrated aluminum salt crystals 40 can also be sufficiently rapid so that a substantial portion of the hydrated aluminum salt crystals 40 do not dissolve. The washing liquid can be purified and reused in the process. The hydrated aluminum salt crystals 40 can optionally be milled, grinded, or tumbled so that the crystals 36 can have a smaller size for later in the process.

Dissolution (42)

The separated hydrated aluminum salt crystals 40 are dissolved 42 with high-purity water 44 to form a second hydrated aluminum salt solution 46. If the acid 20 used is HCl such that the first hydrated aluminum salt solution 24 comprises a PAC solution, then the second hydrated aluminum salt solution 46 will also comprise PAC dissolved in water. In an example, dissolving 42 the separated hydrated aluminum salt crystals 40 can include heating the water 44 to increase the dissolution rate of the hydrated aluminum salt crystals 40.

After dissolving 42 the hydrated aluminum salt crystals 40 to form the second hydrated aluminum salt solution 46, the hydrated aluminum salt in the solution 46 can be converted to alumina via calcination. As shown in FIG. 1, in one example the second hydrated aluminum salt solution 46 is calcined by spray roasting the hydrated aluminum salt solution 46 in a spray-roasting calcination furnace 48 to convert the hydrated aluminum salt in the solution 46 to an alumina powder 50. In an example, the second hydrated aluminum salt solution 46 is sprayed in a fine atomized mist 52 (shown conceptually in FIG. 1). The mist 52 can be sprayed at a top portion of the calcination furnace 48. In some examples, the second hydrated aluminum salt solution 46 is sprayed substantially continuously into the calcination furnace 48. In an example, the second hydrated aluminum salt solution 46 is sprayed directly into the flame of the calcination furnace 48. The second hydrated aluminum salt solution 46 can be sprayed through a spray nozzle 54, such as an alumina atomizing spray nozzle. The second hydrated aluminum salt solution 46 can be injected through the spray nozzle 54 using pressurized air. A venturi can be used to suck the second hydrated aluminum salt solution 46 into the spray nozzle 54 or air pressure can be used to push the second hydrated aluminum salt solution 46 into the spray nozzle 54. In an example, the second hydrated aluminum salt solution 46 can be diluted with high-purity water before spray roasting to change the viscosity of the solution and to alter the alumina particle size produced by the spray roasting.

When the second hydrated aluminum salt solution 46 is sprayed into the calcination furnace 48, the calcination temperature in the calcination furnace 48 converts the hydrated aluminum salt such as PAC to alumina powder and vaporizes the acid, e.g., HCl, and water that formed the solution, resulting in an acid steam 56 exiting the calcination furnace 48. The acid steam 56 can be collected in a heat exchanger, e.g., to condense the acid steam 56, and the condensed acid steam can be recycled back into the process, for example by recycling the condensed acid steam back to the first reaction 18 or by feeding the condensed acid steam into the first reaction vessel. The acid steam 56 can be collected in a series of at least one of one or more heat exchangers, one or more falling film absorbers, and one or more scrubbers. The heat exchangers or falling film absorbers, or both, can be made of graphite or tantalum. A scrubber can be made of one or more of KYNAR (polyvinylidene difluoride (PVDF)), PP, and PE, depending on the temperature of the acid steam 56. The acid steam 56 can be connected to a venturi or cyclone to remove fine alumina dust from the acid steam 56 and to reduce the temperature of the acid steam 56. In an example, the acid steam 56 can be removed tangential to a round furnace 48, which can cause the hot gases in the calcination furnace 48 to swirl in the calcination furnace 48.

The calcination furnace 48 can be a cylinder shape with a conical bottom, as shown in FIG. 1. The calcination furnace 48 can be lined with a high-temperature resistant refractory, such as a high-purity alumina refractory. For example, the calcination furnace 48 can be made of high-purity alumina brick with high-purity alumina mortar or dry-stacked high-purity alumina brick. In accordance with a specific embodiment, an inside surface of the calcination furnace 48 is made of high-purity alumina, which is 99.2%, or greater, purity aluminum oxide refractory, in order to minimize or eliminate contamination of the resulting alumina powder 50. In more specific embodiments, the refractory of the calcination furnace 48 comprises at least about 99.2% purity alumina, or at least about 99.6% purity alumina, or at least about 99.8% purity alumina.

The refractory of the calcination furnace 48 can be inside a metal shell, such as a steel or aluminum shell. The shell can be coated with PTFE or another high-temperature, fluorinated polymer coating or high temperature acid resistant paint. The shell can be kept at a temperature above 110° C. to prevent rust and oxidation of the shell. Alternatively, the calcination furnace 48 can have no shell other than the refractory (e.g., brick) lining. The furnace bricks can be covered with high temperature refractory blanket and aluminum sheet. The furnace can have a domed roof, as seen in FIG. 1. The domed roof can be formed out of shaped bricks, supported bricks, or a one-piece cast roof.

As seen in FIG. 1, the bottom of the calcination furnace 48 can be conical and can include a bottom hole or tube for removal of the alumina powder 50. The removal tube can be made of alumina. Alternatively, the bottom of the calcination furnace 48 can be flat with extra alumina powder 50 being left in the bottom of the furnace. As the powder 50 flows out of the calcination furnace 48 via gravity, the alumina powder 50 remaining in the furnace 48 will form a conical shape.

After being sprayed, such as through the spray nozzle 54, the second hydrated aluminum salt solution 46 is heated to a temperature that is sufficiently high to drive off the liquid of the second hydrated aluminum salt solution 46 (e.g., water and acid) and to calcinate the hydrated aluminum salt to alumina. For example, if a PAC solution is sprayed into the calcination furnace 48, the PAC solution can be heated to a temperature of at least 450° C., such as to a temperature of from about 450° C. to about 1300° C., in order to convert the PAC to alumina. The temperature to which the sprayed second hydrated aluminum salt solution 46 is heated can depend on the phase of alumina that is specified for the particular process. For example, if it is desired to provide predominantly alpha alumina, then the second hydrated aluminum salt solution 46 can be heated to a temperature of at least 900° C., or of at least 1000° C., such as from about 900° C. to about 1300° C. or from about 1000° C. to about 1300° C. If lower temperatures are used, e.g., temperatures below about 900° C. or about 1000° C., then the resulting alumina powder 50 can be a mixture of phases with a majority of the mixture being non-alpha phase, generally referred to as gamma alumina. The predominant phase of the alumina powder 50 can be gamma, theta, kappa or other phases of alumina other than alpha alumina depending on the calcination temperature within the calcination furnace 48.

It has been found that the temperatures required to achieve a particular alumina phase, such as alpha alumina, is lower when using the spray roasting calcination furnace 48 described herein as compared to conventional temperatures required to convert hydrated alumina salt crystals, such as PAC crystals, that are not being spray roasted. For example, it has been found that a temperature of at least 1150° C., and in some cases as much as 1600° C. can be required for calcinating larger PAC crystals to alpha alumina. The lower required temperature in the spray roasting calcination furnace 48 can result in substantially lower energy costs for forming the alumina powder 50.

The calcination furnace 48 can be heated by combustion of fuel, such as natural gas, oil or propane, with one or more burners. The burners for heating the calcination furnace 48 can be proximate to the bottom of the calcination furnace 48, for example just above the start of the bottom conical section. One or more of the burners can be tangential to a round circumference of the calcination furnace 48 so that the hot flue gases will swirl in the calcination furnace 48. There can be a temperature gradient in the calcination furnace 48, such as from the burner to the exhaust point 58. The air for the one or more combustion burners can be filtered. In an example, each of the one or more burners can be fed from about 15% to about 50% excess air. The calcination furnace 48 can also be heated by indirect heat, such as from a natural gas tube burner.

The alumina powder 50 can be removed from the furnace through a tube in the bottom of the calcination furnace 48, such as an alumina removal tube. The removal tube can be heated so that the alumina powder 50 reaches a higher calcination temperature. The alumina powder 50 can be removed continuously from the bottom of the calcination furnace 48. The alumina powder 50 can fill up a container as it comes out of the removal tube. Alumina powder 50 removed from the container can be replaced by gravity flow as more alumina powder 50 is produced. The alumina powder 50 can be removed from the furnace 48 continuously or semi continuously, such as with a rotary valve, rabble rake, auger, or vibrating conveyor.

The alumina powder 50 exiting the calcination furnace 48, e.g., through the removal tube, can help to form at least a partial seal at the furnace exit. The seal can allow the calcination furnace 48 to be operated under slightly negative pressure so that the acidic steam 56, e.g., HCl fumes, will not escape through the bottom exit, but rather will exit the calcination furnace 48 through an exhaust 58. The calcination furnace 48 can be put under negative pressure by a blower that pulls air through a scrubber, such as from the exhaust 58. In an example, the alumina powder 50 can be in the form of hollow shells.

In an example, the spray roasting and calcination can be done in two different furnaces or stages. The first phase can comprise spray roasting and calcination to gamma phase alumina, e.g., in the spray roasting calcination furnace 48 shown in FIG. 1, and a second calcination phase can comprise converting the gamma phase alumina to alpha phase alumina powder 50. The powder can be washed between the two calcinations, for example with acid, or water, or both. In an example, the powder can be washed with one or more of: a rotary drum filter, a filter press, or a pan filter. In an example, the powder can be washed first with acid then with water to remove traces of the acid.

For a two-stage calcination, after being calcinated to the gamma phase, the alumina powder can be placed back into a furnace and further calcinated to a temperature of at least about 1000° C., such as from about 1000° C. to about 1250° C., to convert the gamma alumina powder into alpha alumina powder. After washing, the gamma powder can also be mixed with water and sprayed back into the furnace. The steam and acid coming off the powder can be condensed in a heat exchanger and be reused in the process. The calcination to alpha alumina can also be performed at hotter temperatures, such as from about 1050° C. to about 1600° C., or from about 1250° C. to about 1600° C., to reduce impurities and to increase the loose density of the powder.

Processing (60) of Alumina Powder

The alumina powder 50 can optionally be further processed 60, such as by milling, crushing, or tumbling to provide a processed alumina powder 62 having a desired size profile. For example, the alumina powder 50 can be wet or dry tumbled to break up lumps, such as by adding the alumina powder 50 to a rotating impeller, with or without water, to break up the lumps. In an example, the alumina powder 62 can have an average powder grain size of about 50 nanometers (nm) for gamma alumina and from about 500 nm to about 1000 nm for alpha alumina. In an example, the surface area of the alumina powder 62, as determined by Brunauer-Emmett-Teller (BET) theory, is from about 6 square meters per gram ($m^2/g$) to about 15 $m^2/g$. In an example, the alumina powder 62 can have a density of at least about 0.2 grams per milliliter (g/mL), such as at least about 0.5 g/mL, for example at least about 1 g/mL.

The alumina powder 50, 62 can be separated with a magnet to remove impurities. The alumina powder 50, 62 can be separated by sieving or a fluid bed reactor to separate out particles and impurities.

The alumina powder 50, 62 can be washed 64 to provide a washed alumina powder 66. The alumina powder 50, 62 can be washed 52 with $H_2O$ or an acid, or a combination, such as a weak HCl acid. The alumina powder 50, 62 can be washed with acid and then washed with one or more times to remove traces of the acid. The water or acid used to wash the alumina powder 50, 62 can be a high-purity water or high-purity acid. The washing step 64 can be repeated multiple times as desired to remove any residue from the alumina powder 50, 62. The washing step 64 can include washing the alumina powder 50, 62 with a weak acid, e.g., an acid that is from about 0.5 wt. % to about 5 wt. % HCl, followed by one or more steps of washing with water to provide the washed alumina powder 66. The alumina powder 50, 62 can be rinsed with other types of acid or just with water instead of the HCl and water. The washed alumina powder 66 can be separated from the water and acid by settling or mechanical separation, such as a centrifuge or vacuum filtration (e.g., a rotary drum filter, filter press, a disk filter, or rotary pan filter).

The washed alumina powder 66 can be dried 68, for example in a furnace to remove excess water from the washed alumina powder 66 to provide a dried alumina powder 70 before further processing. In an example, the washed alumina powder 66 is dried in one or more trays comprising one or more of PTFE, PFA, PVDF, aluminum oxide, or aluminum. In an example, a vacuum furnace, a convection oven, a spray dryer, a flash dryer or a microwave oven can be used to dry the washed alumina powder 66 and to help remove impurities from the washed alumina powder 66.

The dried powder 70 can be milled 72, tumbled or ground to reduce the average particle size to provide a milled alumina powder 74. For example, a jet mill, attrition mill, ball mill, or other type of milling equipment may be used to reduce the particle size to a 0.3-3 micron powder. Vibratory tumbling or tumbling in a barrel can also be used to break up lumps or to reduce the particle size. High-purity alumina or sapphire tumbling media can be used. The milling equipment can be lined with high-purity alumina refractory, plastic, or resin.

The milled powder 74 can be sintered in a vacuum furnace to remove impurities and increase the loose pack density of the powder 74. The furnace temperature and vacuum can be varied to get specified results. In an example, a 0.07 Torr vacuum can be applied to a furnace heated to 450° C. In general, higher temperatures and stronger vacuum improve removal of impurities from the powder 74.

The milled alumina powder 74 (or earlier processed powder, such as the washed alumina powder 66 or the dried alumina powder 70) can have a high purity of at least about 99.997%, such as at least about 99.999%, for example at least about 99.99% (about 4N). In an example, the alumina powder 74 can have a purity of less than 10 parts per million weight (ppmw) in all elements. In an example, the alumina powder 74 can comprise less than about 30 ppmw total metallic and alkyl impurities. In an example, the alumina powder 74 can have a sodium (Na) content of less than 10 ppmw, such as less than about 5 ppmw Na, such as less than about 1 ppmw Na. In an example, the alumina powder 74 can have an iron (Fe) content of less than 5 ppmw, such as less than about 3 ppmw Fe, such as less than about 1 ppmw Fe. In an example, the alumina powder 74 can have a silicon (Si) content of less than 10 ppmw, such as less than about 5 ppmw Si, such as less than about 2 ppmw Si. In an example, the alumina powder 74 can have a titanium (Ti) content of less than 1 ppmw, such as less than about 0.2 ppmw Ti. In an example, the alumina powder 74 can have a magnesium (Mg) content of less than about 5 ppmw, such as less than about 2 ppmw Mg. In an example, the alumina powder 74 can have a calcium (Ca) content of less than 5 ppmw, such as less than about 2 ppmw Ca. In an example, the alumina powder 74 can have a potassium (K) content of less than about 5 ppmw. In an example, the alumina powder 74 can have a copper (Cu) content of less than about 1 ppmw. In an example, alumina powder 74 can have a chromium (Cr) content of less than about 1 ppmw.

In an example, the alumina powder 74 can comprise less than 5 ppmw total metallic and alkyl impurities, such as less than 5 ppmw for Fe, Na, and Si. In an example, the alumina powder 74 has less than 5 ppmw for Fe, Na, and Si, and 3 ppmw for all other elements. In an example, the alumina powder 74 has less than 3 ppmw for Fe, Na, and Si and less than 1 ppmw for all other elements.

The milled alumina powder 74 (or earlier processed powder, such as the washed alumina powder 66 or the dried alumina powder 70) can be compressed 76 into a compressed alumina powder 78 having higher density. The compressed alumina powder 78 can be in the form of a pressed shape, such as compressed pucks, pellets, or granules, for eventual conversion into sapphire ingots. Examples of methods that can be performed to compress 76 the powder 74 include, but are not limited to, uniaxial pressing, hydraulic pressing, cold isostatic pressing (CIP), or hot isostatic pressing (HIP). In an example, the compression 76 can increase the density of the alumina powder 74, which can have a density of about 0.3 grams per cubic centimeter (g/cm$^3$) to about 1.0 g/cm$^3$, to a density of the compressed alumina powder 78 of at least about 1.7 g/cm$^3$, such as at least about 1.8 g/cm$^3$, at least about 1.9 g/cm$^3$, at least about 2 g/cm$^3$, at least about 2.1 g/cm$^3$, at least about 2.2 g/cm$^3$, at least about 2.3 g/cm$^3$, at least about 2.4 g/cm$^3$, or at least about 2.5 g/cm$^3$, such as from about 1.7 g/cm$^3$ to about 2.3 g/cm$^3$. The compressed alumina powder 78 can be bound together with a binder, such as a high-purity binder, for the compressed and green alumina. Examples of binders that can be used to bind the compressed alumina powder 78 include, but are not limited to, water, polyethylene glycol (PEG), and polyvinyl alcohol (PVA). The compressed alumina powder 78 can be made into shapes including, but not limited to, cylinders, pucks, rectangles, squares, and hexagons. In an example, the shape of the compressed alumina powder 78 is chosen for packing efficiency of the alumina 78 in a crucible for sintering.

The pressed shape of the compressed alumina powder 78 can be sintered 80 to provide a sintered alumina 82. Sintering 80 can further increase the density of the alumina, such as from the about 1.7 g/cm$^3$ to about 2.3 g/cm$^3$ of the compressed alumina powder 78 to a density of the sintered alumina 82 of at least about 3.0 g/cm$^3$, such as at least about 3.1 g/cm$^3$, at least about 3.2 g/cm$^3$, at least about 3.3 g/cm$^3$, at least about 3.4 g/cm$^3$, at least about 3.5 g/cm$^3$, at least about 3.6 g/cm$^3$, at least about 3.7 g/cm$^3$, at least about 3.8 g/cm$^3$, at least about 3.9 g/cm$^3$, or at least about 4 g/cm$^3$, such as from about 3.2 to about 3.9 g/cm$^3$. In an example, the compressed alumina powder 78 is sintered to a temperature of from about 1500° C. to about 2050° C., such as from about 1550° C. to about 1600° C. The compressed alumina powder 78 can be sintered 80 in a vacuum. The compressed alumina powder 78 can be sintered 80 in an environment comprising, for example, air, hydrogen gas, CO$_2$ gas, an inert gas (such as nitrogen or argon), or a combination of these gases. The sintering 80 can be performed in a furnace that is heated, for example, with electric resistance with elements made of silicon carbide (SiC), graphite, tungsten, or molybdenum disilicide (MoSi$_2$). The sintering furnace can be heated with natural gas burners. The sintering furnace can be insulated with aluminum oxide fiber board or bubble alumina. It has been surprisingly found that when the sintering 80 is included in the process 10, the resulting sintered alumina 82 can have substantially reduced impurities compared to the unsintered alumina, such as the compressed alumina powder 78 or the washed alumina powder 66, the dried alumina powder 70, or the milled alumina powder 74.

The sintered alumina 82 (or earlier processed alumina, such as the compressed alumina powder 78, the milled powder 74, the dried powder 70, or the washed powder 66) can be used as a feedstock for sapphire ingot growth. The alumina powder can be converted into sapphire crackle by melting 84, e.g., via the Verneuil process, to provide sapphire 86. The powder can be used to make sapphire, such as for the cover glass for mobile electronic devices.

Figure 2:
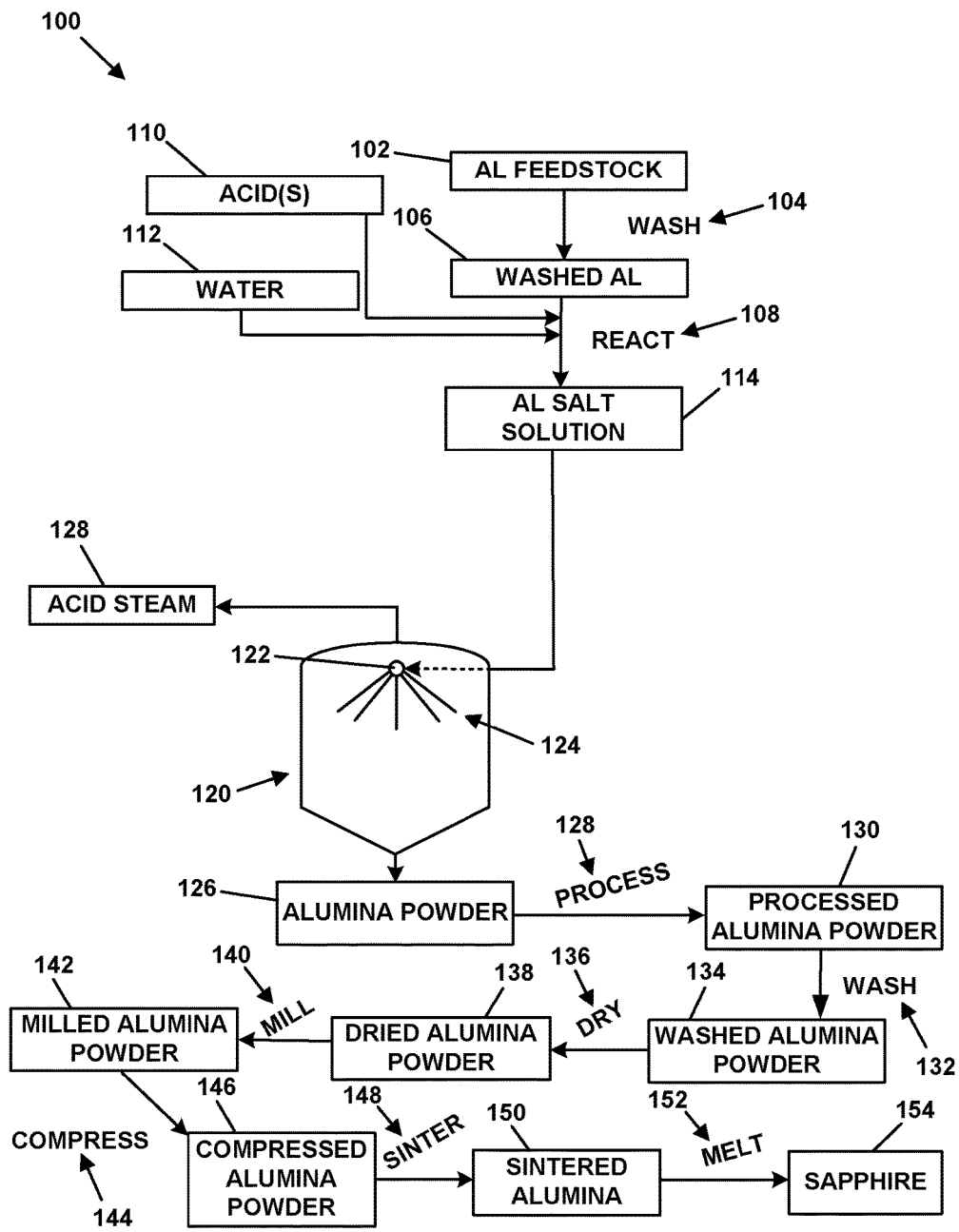
FIG. 2 is a flow diagram of another example method of producing high-purity aluminum oxide.

FIG. 2 is a flow diagram of another example process 100 for producing high-purity aluminum oxide, for example to be used in the production of synthetic sapphire. The process 100 is very similar to process 10 shown in FIG. 1, with one difference. Rather than crystalizing and separating 36 the aluminum salt crystals 40 from the first aluminum salt solution 24 and then dissolving 42 the separated aluminum salt crystals 40 to form a second aluminum salt solution 46, which is then spray roasted, the process 100 includes spray roasting the first aluminum salt solution 114 that is formed as part of a reaction 108 between aluminum metal (either an aluminum feedstock 102 or a washed aluminum 106) and one or more acids 110 in the present of water 112. The reaction 108 can be substantially identical to that described above with respect to reaction 18 in FIG. 1.

In the process 100, it was determined that the purity of the first aluminum salt solution 114 was substantially high such that precipitation and separation of hydrated aluminum salt crystals (e.g., steps 28 and 36 in FIG. 1) followed by a secondary dissolving step to form a second salt solution (e.g., step 42 in FIG. 1) is not necessary. In an example, the aluminum salt solution 114 has less than 3 ppmw total impurities, such as less than 0.5 ppmw of Fe, Na, and Si and less than 0.3 ppmw of all other elements. In other words, other than water, acid, sulfur, carbon, and the hydrated aluminum salt molecules (e.g., PAC), the aluminum salt solution 114 has only 3 ppmw or less of other impurities.

The process 100 shows a calcination furnace 120 into which the aluminum salt solution 114 can be spray roasted. The method of spray roasting the aluminum salt solution 114 and the calcination furnace 120 can be substantially identical to method and the calcination furnace 48 described above with respect to the process 10 in FIG. 1, e.g., with a spray nozzle 122 that can spray the aluminum salt solution 114 as a fine mist 124 to allow for calcination of the fine mist 124 to form alumina powder 126. The calcination furnace 120 can drive off the liquid of the aluminum salt solution 114 to form an acid steam 128 that can be condensed and recycled, as described above.

As described above, the calcination furnace 120 can be lined with a high-temperature resistant refractory. In an example, the refractory comprises a high-purity alumina refractory. Use of high-purity alumina (as defined above) for the refractory minimizes or eliminates contamination of the resulting powder 126.

The remainder of the process 100 can be substantially identical to process 10 described above. For example, the alumina powder 126 can be further processed 128 (e.g., milled or tumbled to break up chunks) to provide a processed alumina powder 130. The processed powder 130 can be washed 132 to provide a washed powder 134, which in turn can be dried 136 to provide a dried alumina powder 138. The dried powder 138 can be milled 140 or otherwise processed to provide a desired size of the powder particles in the form of a milled alumina powder 142. The milled powder 142 can be compressed 144 to provide a compressed alumina powder 146, which can be sintered 148 to provide a sintered alumina 150. The sintered alumina 150 can be converted into sapphire crackle by melting 152, e.g., via the Verneuil process, to provide sapphire 154. High-purity alumina-based sapphire, such as that which can be prepared by the process 100, can be used, for example, as substrates in the production of LEDs As an alternative to sapphire production, alumina powder made by the process described herein, such as the milled powder 74, 142, the dried powder 70, 138, or the washed powder 66, 134, can be used in battery production, such as to coat a separator, or as an additive in the anode or cathode. High-purity alumina, such as that produced by the processes described herein, can also be used in semiconductor wafer processing equipment, phosphor-based applications (e.g., plasma display panels), sensors (e.g., automotive sensors) and in certain industrial applications, such as, but not limited to the fields of ceramics, abrasives and separation membranes where particularly high-purity material is required.

EXAMPLES

The embodiments of the present invention can be better understood by reference to the following examples which are offered by way of illustration. The present invention is not limited to the example given herein.

Example 1

250 g of aluminum was etched with 10% HCl for 48 hours at room temperature to clean the surfaces of the aluminum. The aluminum was then placed in a PTFE beaker with 361 g of water and 653 g of 38% HCl. The PTFE beaker was heated with a water bath to about 81° C. Water was added to the beaker as the liquid level lowered due to evaporation. A lid was used on the beaker with a small hole to help reduce evaporation. The solution was left to react for 7 days. After reaction, unreacted aluminum was removed from the beaker.

Next, the PTFE beaker, with the remaining solution, was placed on a hot plate and heated at 240° C. for about 8 hours to evaporate liquid from the beaker and precipitate PAC crystals from the solution. Once evaporation was completed, 59 g of mother liquor was filtered away from 697 g of aluminum salt crystals.

The aluminum salt crystals were dissolved in high-purity water to produce 1000 g of a PAC solution. The PAC solution was then sprayed into a furnace set at 650° C. over the course of 4 hours. Acidic fumes from the furnace exhaust were condensed for recycling. The resulting alumina powder was allowed to cool and was then washed with water twice. The washed powder was put back into the furnace and heated at 1100° C. for 16 hours and then held for an additional 30 minutes. Any fumes were condensed and recycled. The powder was then washed 4 times in water and dried at a temperature of 130° C. to provide a dried alumina powder.

The chemistry of the dried alumina powder was tested by glow discharge mass spectrometry (GDMS). The dried alumina powder had the composition shown in Table 1.

TABLE 1

Impurity Composition for Dried Alumina Powder; Example 1

| Impurity | Content (ppmw) |
| --- | --- |
| Na | 1.9 |
| Si | 4.1 |
| Fe | 1.7 |
| Ca | 0.85 |
| Mg | 0.26 |
| Ga | <0.1 |
| Cr | <0.5 |
| Ni | <0.5 |
| Ti | 0.11 |
| Mn | <0.05 |
| Cu | <1 |
| Zn | 1.3 |
| Zr | <0.1 |
| K | 0.85 |
| P | 0.85 |
| S | <0.5 |

The dried powder was dry tumbled and jet milled, reducing the particle size distribution D50 of 0.87 micrometers (μm). The milled powder was compressed in a hydraulic uniaxial die to form an alumina puck with a green density of 2.20 g/cm$^3$ with a square dimension of 2 inches (about 5 centimeters (cm))×2 inches (about 5 cm) and a thickness of 1 inch (about 2.5 cm). The green alumina puck was sintered in a furnace with an air atmosphere at a temperature of 1550° C., resulting in a sintered alumina puck having a density of about 3.55 g/cm$^3$.

Example 2

105 kg of 4.8N aluminum, 250 L of 18 MΩ water, and 100 L of reagent-grade HCl were placed in a 400 L plastic polypropylene tank. The tank was heated to 65° C. and the aluminum, water, and HCl were allowed to react until the specific gravity of the resulting solution reached 1.295 g/cm$^3$. This resulting in 304 kg of a PAC solution from 19 kg of the aluminum reacted over 5 days.

The PAC solution was placed in a new tank and heated to 125° C. for 4 days resulting in a mixture of precipitated aluminum chlorohydrate crystals in a mother liquor. The mother liquor was drained away from the crystals using polypropylene filter bags. The heating produced 134 kg of the aluminum chlorohydrate crystals and 59 kg of mother liquor.

Next, the aluminum chlorohydrate crystals were dissolved in high-purity water (e.g., 18 MΩ water) to produce a second PAC solution. The second PAC solution was sprayed into a furnace and was calcinated at a temperature of 1150° C. This produced 25 kg of alumina powder.

The alumina powder was separated into two batches. The first batch was washed 4 times with 25 kg of 18 MΩ water. The second batch was washed with 25 kg of 1% HCl for 12 hours, and then washed 4 times with 25 kg of 18 MΩ water. Both batches were dried in a furnace at 130° C. for 4 hours and were separately dry tumbled for 10 minutes with sapphire crackle as the tumbling media. The batches were separately metered into a jet mill to provide a powder with a particle size distribution D50 of 0.88 μm. The chemistry of both batches of milled powder was as tested with GDMS, resulting in the impurity profiles shown in Table 2.

TABLE 2

Impurity Composition for Dried Alumina Powder; Example 2, Batches 1 and 2

| Impurity | Batch 1 (Water Wash Only) Content (ppmw) | Batch 2 (HCl Leach) Content (ppmw) |
| --- | --- | --- |
| Na | 35 | 9.5 |
| Mg | 0.51 | 0.37 |
| Si | 1.8 | 1.3 |
| Ti | 0.07 | 0.15 |
| Mn | 1.2 | 0.27 |
| Fe | 2.5 | 1.7 |
| Zn | 1.7 | <0.5 |
| P | 0.53 | 0.24 |

The two batches of alumina powder were each separately tumbled in a barrel mixer and 2-5 wt. % of 18 MΩ water was added as a binder. The powder was pressed into pucks in a square die having the dimensions of 2 inches (about 5 cm)×2 inches (about 5 cm)×0.6 inches (about 1.5 cm) with a 50 metric ton hydraulic press. The compressed were sintered in a furnace at a temperature of 1550° C., resulting in sintered pucks having a density of 3.6 g/cm$^3$.

Example 3

A separate batch of alumina powder was prepared in the same way as in Example 2. The batch was separated between the washed powder and the powder that had been compressed into a puck and sintered. The chemistry of the washed powder and the sintered puck was tested with GDMS, resulting in the impurity profiles shown in Table 3.

TABLE 3

Impurity Composition for Washed Alumina Powder; Example 3

| Impurity | Washed Powder (ppmw) | Sintered Puck (ppmw) |
| --- | --- | --- |
| Na | 11 | 7.9 |
| Mg | 0.69 | 1.3 |
| Si | 1.4 | 4.8 |
| Ti | 0.12 | 0.11 |
| Mn | 0.63 | 0.18 |
| Fe | 1.3 | 1.5 |
| Zn | <0.5 | 0.69 |
| P | 0.19 | 0.17 |

Example 4

Approximately 400 L of PAC was made by reacting reagent-grade HCl, 4.8 N aluminum, and 18 MΩ water in a plastic tank while heating the tank to 85° C. The 400 L of PAC was transferred to a new plastic tank and heated to 130° C. so that aluminum chlorohydrate crystals precipitated from the solution. About 10% of the mother liquor was then removed from the aluminum chlorohydrate crystals by gravity drainage through a plastic filter. The aluminum chlorohydrate crystals were then dissolved in 18 MΩ water to make a second PAC solution.

The second PAC solution was sprayed into a calcination furnace that had been heated to 1100° C. The acid that evolved during calcination was condensed in a graphite heat exchanger. 50 kg of alumina powder was made.

Next the alumina powder was washed in 1% HCl for 12 hours then rinsed 3 times with 18 MΩ in a large plastic Buchner funnel. The washed and rinsed powder was then dried in a convection oven at 130° C. The dried powder was tumbled to remove any lumps and then jet milled.

A small amount of 18 MΩ water was then sprayed onto the milled powder while mixing the powder with a paddle mixer. The wetted powder was then pressed into square pucks with a 50 metric ton hydraulic press. The pucks were then placed into a sintering furnace and sintered to 1550-1600° C. When tested by GDMS the pucks had the impurity profile shown in Table 4.

TABLE 4

Impurity Composition for Example 4 Sintered Pucks

| Impurity | Content (ppmw) |
|---|---|
| Na | 6.3 |
| Mg | 0.85 |
| Si | 2.4 |
| Ti | 0.12 |
| Mn | 0.41 |
| Fe | 4.5 |
| Zn | <0.5 |
| P | <0.1 |

Example 5

1500 L of PAC solution was made by reacting 4.8 N aluminum, reagent-grade HCl, and 18 MΩ water in a heated tank. The PAC solution was then sprayed into a calcination furnace at 750° C. over the course of 24 hours. The PAC solution was converted to gamma alumina powder in the furnace and was removed through the bottom of the furnace. Acidic fumes from the calcination were collected in a graphite heat exchanger for reuse in the process.

The gamma alumina powder was then dry tumbled to remove any large lumps and washed with high-purity 1% HCl solution for 24 hours. Next, the powder was rinsed 4 times with 18 MΩ water. The washed and rinsed powder was dried in a convection oven at 130° C. The powder was then placed in alumina saggers and calcinated to 1200° C. to convert the gamma alumina powder to alpha alumina powder. Fumes from the alumina saggers were recycled in a graphite heat exchanger. The alpha alumina powder was then washed for 24 hours in 1% HCl and then rinsed 3 times with 18 MΩ water. The washed and rinsed alpha alumina powder was then dried in a furnace at a pressure of 0.07 Torr and a temperature of 450° C. for 3 hours.

Example 6

1500 L of PAC solution was made by reacting 4.8 N aluminum, reagent-grade HCl, and 18 MΩ water in a heated tank. The PAC solution was then sprayed into the top of a calcination furnace at a temperature of 1070° C. over the course of 48 hours. The PAC was converted to alpha alumina powder in the furnace. Acidic fumes from the calcination furnace were collected in a graphite heat exchanger for reuse in the process.

After calcination, the alpha alumina powder was washed with high-purity water in a filter press until the rinse water pH was greater than 4. The washed and rinsed alpha alumina powder was dried in a flash dryer. Next, the powder was jet milled to reduce the particle size, then wet tumbled with high-purity alumina media to further reduce median particle size.

The tumbled slurry was then spray dried in a furnace at 300° C. For sapphire application, the powder was mixed with 18 MΩ water as a binder and the powder was pressed into pucks. The pucks were sintered at 1600° C. in a vacuum over 12 hours, resulting in a sintered puck with a density of 3.70 g/cm³. The alpha alumina powder had a purity greater than 99.998 wt %. For battery separator applications the powder was dry tumbled after spray drying instead of being pressed into pucks.

Example 7

1500 L of PAC solution was made by reacting 4.8 N alumina, reagent-grade HCl, and 18 MΩ water in a heated tank. The PAC solution was then sprayed into the top of a calcination furnace heated to a temperature of 750° C. over the course of 24 hours. The PAC was converted to gamma alumina powder in the furnace and was removed through the bottom of the furnace in a 3 inch (about 7.6 cm) diameter alumina tube. The alumina tube exiting the bottom of the spray chamber was heated to 1150° C. using a tube furnace to convert the gamma alumina powder to alpha alumina powder. Acidic fumes from the calcination furnace were collected in a graphite heat exchanger for reuse in the process.

After calcination, the alpha alumina powder was dry tumbled to remove large lumps. The alpha alumina powder was then washed with high-purity 1% HCl solution for 24 hours. Next, the washed powder was rinsed 4 times with 18 MΩ water. The washed and rinsed alpha alumina powder was dried in a convection oven at a temperature of 130° C. and then dry tumbled to remove lumps. The alpha alumina powder was then jet milled to reduce the particle size. 18 MΩ water was mixed into the milled powder as a binder and the powder was pressed into pucks. The pucks were then sintered at 1600° C. in a vacuum over 12 hours, resulting in a sintered puck with a density of 3.70 g/cm³. The alpha alumina powder had a purity greater than 99.998 wt %.

The above Detailed Description is intended to be illustrative, and not restrictive. For example, the above-described embodiments (or one or more elements thereof) can be used in combination with each other. Other embodiments can be used, such as by one of ordinary skill in the art upon reviewing the above description. Also, various features or elements can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

Method examples described herein can be machine or computer-implemented, at least in part. Some examples can include a computer-readable medium or machine-readable medium encoded with instructions operable to configure an electronic device to perform methods or method steps as described in the above examples. An implementation of such methods or method steps can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The Abstract is provided to allow the reader to quickly ascertain the nature of the technical disclosure. It is submitted with the understanding that it will not be used to interpret or limit the scope or meaning of the claims.

Although the invention has been described with reference to exemplary embodiments, workers skilled in the art will recognize that changes may be made in form and detail without departing from the spirit and scope of the invention.

What is claimed is:

1. A method comprising:
(a) reacting aluminum metal with an acid in the presence of water to provide a first aluminum salt solution comprising an aluminum salt in water, wherein the aluminum salt comprises a reaction product of the acid and the aluminum metal;
(b) heating the first aluminum salt solution to provide a mother liquor and solid aluminum salt;
(c) separating the solid aluminum salt from the mother liquor;
(d) dissolving at least a portion of the separated solid aluminum salt with water to provide a second aluminum salt solution; and
(e) spray roasting the second aluminum salt solution at a temperature of from about 1000° C. to about 1300° C. to provide an aluminum oxide powder, wherein the spray roasting is performed in a furnace lined with a refractory comprising alumina that is at least about 99.2% purity alumina;
wherein the aluminum oxide powder is 99.99% pure aluminum oxide or greater and comprises less than about 30 ppmw total metallic and alkyl impurities.

2. The method of claim 1, further comprising (g) sintering the alumina powder.

3. The method of claim 1, wherein spray roasting the second aluminum salt solution comprises spraying the second aluminum salt solution into a furnace that is heated to drive off liquid from the second aluminum salt solution and to convert the dissolved aluminum salt to the aluminum oxide powder.

4. The method of claim 1, wherein the refractory of the furnace comprises at least about 99.6% purity alumina.

5. The method of claim 1, further comprising, after step (c), washing the solid aluminum salt crystals to remove surface impurities and provide washed aluminum salt crystals that are dissolved in water in step (d) to provide the second aluminum salt solution.

6. The method of claim 1, wherein the aluminum oxide powder comprises less than about 5 ppmw of each of Na, Si, Fe and less than about 1 ppmw for Ti, Mg, Ca, K, Cu, and Cr.

7. The method of claim 1, further comprising, after step (f), milling the aluminum oxide powder to a specified particle size.

8. The method of claim 1, further comprising, after step (f), heating the aluminum oxide powder to a temperature of from about 1000° C. to about 1250° C. to convert gamma aluminum oxide to alpha aluminum oxide.

9. The method of claim 1, wherein the second aluminum salt solution has less than 3 ppmw total impurities.

10. The method of claim 9, wherein the second aluminum salt solution has less than 0.5 ppmw of each of Fe-containing impurities, Na-containing impurities, and Si-containing impurities, and less than 0.3 ppmw of all other impurities.

11. A method comprising:
(a) reacting aluminum metal with an acid in the presence of water to provide an aluminum salt solution comprising an aluminum salt in water, wherein the aluminum salt comprises a reaction product of the acid and the aluminum metal; and
(b) spray roasting the aluminum salt solution at a temperature of from about 1000° C. to about 1300° C. to provide an aluminum oxide powder, wherein the spray roasting is performed in a furnace lined with a refractory comprising alumina that is at least about 99.2% purity alumina;
wherein the aluminum oxide powder is 99.99% pure aluminum oxide or greater and comprises less than about 30 ppmw total metallic and alkyl impurities.

12. The method of claim 11, further comprising (d) sintering the alumina powder.

13. The method of claim 11, wherein spray roasting the aluminum salt solution comprises spraying the aluminum salt solution into a furnace that is heated to drive off liquid from the aluminum salt solution and to convert the dissolved aluminum salt to the aluminum oxide powder.

14. The method of claim 13, wherein the furnace is heated to a temperature that calcinates the aluminum salt to convert the aluminum salt to aluminum oxide.

15. The method of claim 11, wherein the refractory of the furnace lined with a refractory comprising a high-purity alumina comprises at least about 99.6% purity alumina.

16. The method of claim 11, wherein the aluminum oxide powder comprises less than about 5 ppmw of each of Na, Si, Fe and less than about 1 ppmw for Ti, Mg, Ca, K, Cu, and Cr.

17. The method of claim 11, further comprising, after step (c), milling the aluminum oxide powder to a specified particle size.

18. The method of claim 11, further comprising, after (c), heating the aluminum oxide powder to a temperature of from about 1000° C. to about 1250° C. to convert gamma aluminum oxide to alpha aluminum oxide.

19. The method of claim 11, wherein the aluminum salt solution has less than 3 ppmw total impurities.

20. The method of claim 19, wherein the aluminum salt solution has less than 0.5 ppmw of each of Fe-containing impurities, Na-containing impurities, and Si-containing impurities, and less than 0.3 ppmw of all other impurities.

* * * * *

UNITED STATES PATENT AND TRADEMARK OFFICE
CERTIFICATE OF CORRECTION

PATENT NO. : 10,081,553 B2
APPLICATION NO. : 15/552946
DATED : September 25, 2018
INVENTOR(S) : Nichol et al.

Page 1 of 1

It is certified that error appears in the above-identified patent and that said Letters Patent is hereby corrected as shown below:

On the Title Page

Item (71), in "Applicant", in Column 1, Line 1, after "Toronto", insert --, Ontario--

Item (72), in "Inventors", in Column 1, Line 1, after "Toronto", insert --, Ontario--

Item (72), in "Inventors", in Column 1, Line 2, after "Brampton", insert --, Ontario--

Signed and Sealed this
Twenty-third Day of June, 2020

Andrei Iancu
*Director of the United States Patent and Trademark Office*